Aug. 30, 1960

R. A. SHAHBENDER 2,951,118

BELT DRIVEN SYSTEMS

Filed June 13, 1956

*INVENTOR.*
RABAH A. SHAHBENDER

BY *Arthur H. Swanson*

ATTORNEY.

United States Patent Office 2,951,118
Patented Aug. 30, 1960

2,951,118

BELT DRIVEN SYSTEMS

Rabah A. Shahbender, Westmont, N.J., assignor to Minneapolis-Honeywell Regulator Company, Minneapolis, Minn., a corporation of Delaware Filed June 13, 1956, Ser. No. 591,114

4 Claims. (Cl. 178—7.6)

A general object of the present invention is to provide a new and improved belt driven system. More specifically, the present invention is concerned with a facsimile scanning system employing continuous belt driven scanning heads.

The use of continuous belt driven scanning heads in a facsimile scanning system permits the scanning of an endless copy. In addition, the mechanical structure of such an apparatus is relatively non-complex when compared with the structure of a scanning system employing reciprocating scanning heads.

Prior art continuous belt scanners basically comprise a belt, running between pulleys attached to parallel shafts which are supported by adjustable bearing mounts. One of the pulleys is driven at a constant speed and has teeth engaging the belt. For continuous scanning, a plurality of scanning heads are mounted at appropriately spaced distances on the belt. The line of copy to be scanned is either above or below the belt and parallel to the edge of the belt where it extends between the pulleys. The flat portion of the belt travel between the pulleys is the scanning distance. The major problem in such a system is that of maintaining a uniform prescribed belt velocity while preventing the possibility of belt motion, other than that defined by this velocity, in any direction relative to the line of copy being scanned.

It is a specific object of the present invention to provide means in a belt driven scanning system to insure that belt motion, other than that defined by the belt velocity, is reduced to an acceptable minimum.

Since the scanning heads are attached to the surface of the belt, they move at the velocity of the belt, which is linear adjacent to the scanned line and rotational where the belt rounds the pulleys. To a dynamic system so composed there are applied impulsive forces at the points where the belt velocity changes from linear to rotational and vice versa. These forces produce oscillating displacements of the scanning heads with respect to the scanning line which decay at a rate determined by the dynamic coefficients of the system. In addition, impulsive forces caused by other heads on the belt going through velocity changes are transmitted along the belt to the head scanning at a particular time.

It is another specific object of the present invention to provide means in a belt driven scanning system to substantially reduce the impulsive forces applied to the scanning heads due to rapid transitions between rotational and linear velocity.

One means for eliminating the effects of forces produced as a result of rapid velocity changes is to provide a suitable settling distance between the point where the forces occur and the point where the head starts to scan, in which distance the effect of these forces will be damped by the dynamic coefficients of the system. Providing such a settling distance, however, increases the size of the system and is hence undesirable. It is therefore a further object of the present invention to reduce or eliminate entirely the settling distance required in a scanning system.

The various objects of the present invention are achieved by providing belt supporting means which define parabolic arcs to provide gradual rotational deceleration and acceleration where the belt enters and leaves the scanning region. In this manner, rapid velocity changes are eliminated, reducing the forces applied to the scanning heads.

The various features of novelty which characterize this invention are pointed out with particularity in the claims annexed to and forming a part of this specification. For a better understanding of this invention, its advantages and specific objects obtained with its use, reference should be had to the accompanying drawings and descriptive matter in which preferred embodiments of this invention are illustrated and described.

Figure 1:
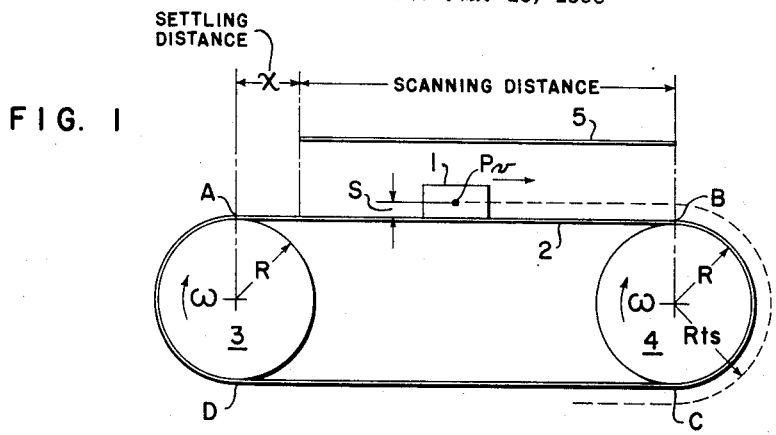
Fig. 1 is a schematic diagram of a prior art belt driven scanner.

Referring now to Fig. 1, the numeral 1 represents a scanning head mounted on an endless belt 2 extended between the pulleys 3 and 4. One of the pulleys is driven at the constant velocity indicated as $\omega$, and has teeth engaging the belt 2. The numeral 5 indicates the copy to be scanned, which is positioned above the belt 2 and parallel therewith between where the belt 2 extends between the pulleys 3 and 4.

Figure 2:
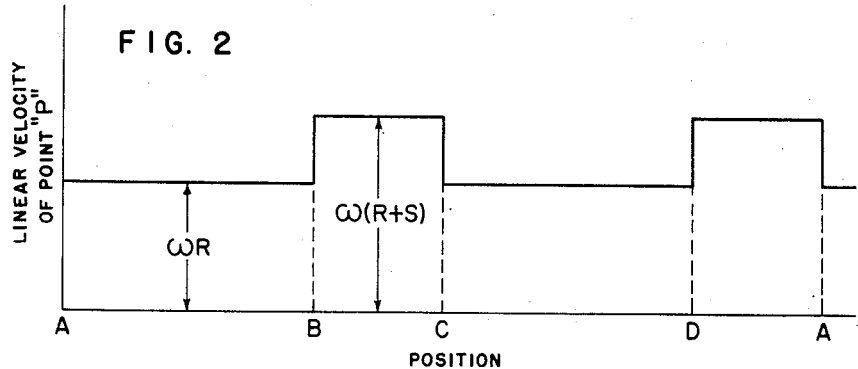
Fig. 2 is a graph showing the velocity of the scanning head in the system shown in Fig. 1.

The major problem of such a system from a mechanical standpoint is that of maintaining a uniform prescribed belt velocity. Since the purpose of the belt is to provide a moving mount for some or all of the elements of the scanning system, the belt has masses attached to various parts of its surface. An elementary analysis will indicate the nature of the effect of these masses upon the instantaneous positional stability of the belts. The graph in Fig. 2 illustrates the essential factors in this problem. The endless belt is mounted between two pulleys of radius R, and has attached to its surface a scanning head, a center of mass of which is at a distance S above the belt. The line of copy to be scanned may be regarded as either being above or below the belt and parallel to the edge of the belt where it extends between the pulleys. The linear velocity, V, of the scanning head must be constant as it moves along the path adjacent to the scanning line, and, since the mass is attached to the belt, it is obvious that the surface of the belt must also move at the velocity V. Further, to eliminate "dead time," there will be a number of scanning heads on the belt placed so that one of them is always moving adjacent to the scanning line.

The linear velocity of any point on the belt must always be V. It is apparent that the pulleys must rotate at a constant angular velocity, $\omega$, such that $\omega = V/R$. Consider now that the point P defines the center of the mass of one of the scanning heads. The linear velocity of the point P as it moves from A to B has been stated to be V. However, as it moves from B to C, it must have a tangential velocity $V' = \omega(R+S)$, since it has further to travel from B to C than does the surface of the belt to which it is attached. This situation is illustrated by the velocity diagram shown in the graph of Fig. 2. In the case described, this corresponds to infinite acceleration and rates of change of acceleration at the points A, B, C, and D.

In the physical scanning system, of course, there will be some compliance in the attachment of the mass to the belt and the belt itself will have mass, compliance, and damping coefficients. However, to a dynamic system so composed there will be applied impulsive forces at the points where the belt velocity changes from linear to rotational and vice versa. These forces will produce oscillating displacements of the scanning heads with respect to the scanning line which will decay at a rate determined by the dynamic coefficients of the system. If these forces are sufficiently large, time must be allowed for the oscillations of a given scanning head to cease before it begins to scan a line of copy. Thus, the settling distance X between the point A and the beginning of the active scanning line is provided. In addition, impulses caused by other scanning heads on the belt going through velocity changes are transmitted along the belt to the head scanning at the particular time.

Figure 3:
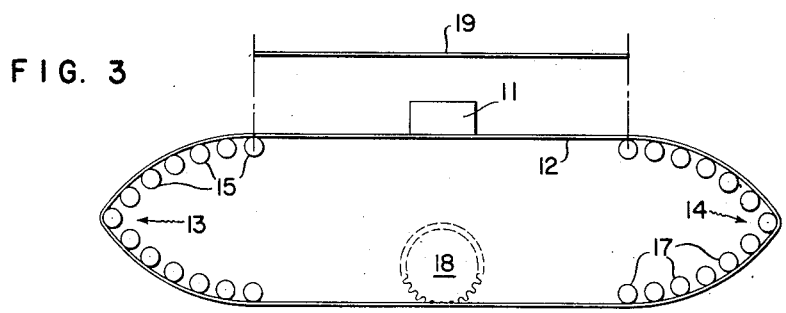
Fig. 3 is a schematic diagram of the belt driven scanning system of the present invention.

Referring now to Fig. 3, there is shown a schematic diagram of an embodiment of the present invention designed to substantially reduce or eliminate the impulsive forces applied to the scanning heads in a scanning system such as that shown in Fig. 1. The numeral 11 indicates a scanning head carried by an endless belt 12. The endless belt 12 is extended between a pair of supporting means generally indicated as 13 and 14. The supporting means 13 comprises a plurality of rollers 15 positioned to define a parabolic arc. Similarly, supporting means 14 comprises a plurality of rollers 17 positioned to define a parabolic arc. Driving means 18, shown here as a spur gear, engages the belt for driving purposes. As shown, the copy to be scanned, 19, is above the belt 12 parallel thereto where it extends between the supporting means 13 and 14.

Since the belt 12 is supported on two sets of rollers, each placed so as to fall on a parabolic arc, the change in the linear velocity of the head as it describes the arc at each end of the straight path is made gradual. In this manner, the scanning head will not be subjected to large forces produced by sudden changes in velocity. The transition between angular velocity and linear velocity may be made as gradual as necessary by proper choice of the parabolic arc. By the use of the shaped guides, the settling distance X may be greatly reduced or eliminated entirely. It should be noted that solid guides could replace the rollers where belt friction is not a problem.

While, in accordance with the provisions of the statutes, there has been illustrated and described the best forms of the embodiment of the present invention now known, it will be apparent to those skilled in the art that changes may be made in the form of the apparatus disclosed without departing from the spirit of the invention as set forth in the appended claims and that in some instances certain features of the invention may be used to advantage without corresponding use of other features.

Having now described this invention what is claimed as new and that which it is desired to secure by Letters Patent is:

1. In a facsimile scanning system, an endless belt for carrying the scanning heads, a pair of belt supporting means providing a flat travel path for said belt adjacent the copy to be scanned, and means engaging said belt to drive it around said supporting means, said supporting means being in the shape of parabolic arcs to provide gradual rotational deceleration into said flat portion of belt travel.

2. In a facsimile scanning system, an endless belt, a pair of belt supporting means providing a pair of parallel linear regions of belt travel, said endless belt being extended between said supporting means, a scanning head mounted on said belt, and means engaging said belt to drive it between said means, said supporting means being shaped to define parabolic arcs to provide gradual rotational deceleration and acceleration where said belt enters and leaves said linear region of belt travel.

3. Apparatus as specified in claim 2 wherein said supporting means comprise two sets of rollers positioned to define parabolic arcs.

4. In a facsimile machine for recording on a recording sheet or web, a scanning system including an endless belt and a plurality of spaced rollers for supporting said belt so that said belt moves in an endless scanning path having at least one straight portion and one curved portion, a stylus holder affixed to said belt and carrying a stylus for traversing the recording sheet or web at a scanning line position, and means for preventing said stylus holder from introducing disturbances in the stylus belt when the stylus holder is passing around said rollers, comprising, means for mounting at least some of said plurality of spaced rollers so that the faces of said rollers in contact with said recording sheet or web are located in a parabolic arc.

References Cited in the file of this patent

UNITED STATES PATENTS

| | | |
|---|---|---|
| 1,660,102 | Smyth | Feb. 21, 1928 |
| 2,632,048 | Mason | Mar. 17, 1953 |